United States Patent [19]
Van Deventer

[11] Patent Number: 5,223,708
[45] Date of Patent: Jun. 29, 1993

[54] ALIGNMENT INSENSITIVE OPTICAL POSITION SENSOR

[75] Inventor: Bruce Van Deventer, Seattle, Wash.

[73] Assignee: The Boeing Company, Seattle, Wash.

[21] Appl. No.: 771,612

[22] Filed: Oct. 4, 1991

[51] Int. Cl.⁵ .................................................. H01J 5/16
[52] U.S. Cl. ................................ 250/227.23; 250/226
[58] Field of Search ................ 250/227.18, 227.23, 250/226, 231.1, 211 K

[56] References Cited

U.S. PATENT DOCUMENTS

| | | | |
|---|---|---|---|
| 3,482,106 | 12/1969 | Anderegg, Jr. et al. | 250/231 |
| 4,334,152 | 6/1982 | Dakin et al. | 250/226 |
| 4,652,747 | 3/1987 | Ellis | 250/231 SE |
| 4,748,686 | 5/1988 | Glomb | 455/605 |
| 4,769,537 | 9/1988 | Taillebois et al. | 250/231 SE |
| 4,829,342 | 5/1989 | Nishimura | 356/356 |
| 4,849,624 | 7/1989 | Huggins | 250/226 |
| 4,868,385 | 9/1989 | Nishimura | 250/231 SE |
| 4,908,510 | 3/1990 | Huggins et al. | 250/231.13 |
| 4,931,636 | 6/1990 | Huggins | 250/226 |
| 4,947,038 | 8/1990 | Weismeier et al. | 250/227.23 |

FOREIGN PATENT DOCUMENTS 55-52911 4/1980 Japan .

*Primary Examiner*—David C. Nelms
*Attorney, Agent, or Firm*—Christensen, O'Connor, Johnson & Kindness

[57] ABSTRACT

An alignment insensitive optical position sensor produces a signal indicative of the position of an element in respect to a monitoring point. The position sensor (50, 100, 120, 180, 200) includes a light source (56, 126) that provides a test light and a reference light of different wavelengths. The test light and reference light are conveyed through an optical fiber (68, 128) and collimated by a lens (70, 110, 144) along a path toward an encoded track or surface (72, 102, 138, 152, 204, 206). The encoded track or surface includes a plurality of metallic dots (74, 104, 140, 154) that are of varying size and/or density to produce a variable reflectivity. The encoded surface also includes an interference filter (76, 106) that reflects the reference light, but transmits the test light, due to the differences in their wavelengths. The reflected test light and reference light are conveyed to a light detector (84, 148, 162) that determines the ratio of the intensity of reflected test light to the intensity of reflected reference light. This ratio is indicative of the relative position of the encoded surface. In several of the embodiments of the alignment insensitive position sensor, the test light and reference light are split along two paths and directed toward separate encoded surfaces that include metallic dots applied in symmetrically inverse relationship in respect to density and/or size. The sum of the ratios of the intensities of reflected test light and reference light for each of these two encoded surfaces should thus be proportional to a constant value, unless a fault has occurred in the position sensor. A processor (168) determines the ratio of the intensities of reflected test light and reference light from each of the encoded surfaces, and determines the sum of the two ratios in order to detect any failure of the position sensor.

24 Claims, 6 Drawing Sheets

ALIGNMENT INSENSITIVE OPTICAL POSITION SENSOR

FIELD OF THE INVENTION

This invention generally pertains to an optical position sensor, and particularly, to a position sensor that uses optical fibers to convey measurement and reference light beams toward a surface to measure the position of the surface relative to the sensor.

BACKGROUND OF THE INVENTION

Although a variety of electrical and electronic sensors are known for determining the position of a mechanical element, such devices generally suffer from susceptibility to natural and man-made electromagnetic noise and other environmental effects that can degrade their performance. For this reason, electrically passive optical position sensors offer a clear advantage for use in extreme environments and in applications where very high reliability is important. For example, optical sensors will soon be employed on aircraft for sensing the position of control surfaces and may be incorporated into a servo system in which the position command and the position feedback information are generated by two similar optical sensors.

Either digital or analog encoding techniques can be used in an optical position sensing system to precisely determine the position or monitor movement of a ratary shaft or linear actuator. In these systems, light signals are usually conveyed to and from the sensors by optical fibers. Typically, light propagating through an optical fiber from a remote source is modulated by an encoded track on a mechanical element that rotates or moves linearly. The modulated light signal is conveyed to a light sensor that determines the position of the mechanical element based on the modulated intensity of the light signal.

Both the reflective and transmissive properties of an encoded track have been used in prior art devices for analog modulation of a light signal to sense position. In the case of transmissive modulation, the density of the encoded track varies as a function of its position relative to the light beam passing through it. Alternatively, the reflectivity of the encoded track can be varied with the position of the element relative to the incident light beam so that the intensity of light reflected from the encoded surface determines the surface position. In either case, the optical fiber that conveys the modulated light signal from the light sensor is disposed so that the light modulated by the encoded track is directed into it.

Since the intensity of light reaching the remote light sensor is determinative of the position of the mechanical element, any variation in light intensity not caused by the reflectivity or transmissivity of the encoded track represents an error in this determination. For example, instability in the light source intensity or in the sensitivity of the light sensor, variable light losses in the optical fiber interconnections, or contamination of the exposed optical surfaces of the position sensor can introduce a variation in the light intensity perceived at the light sensor, and can thus contribute a significant error in the position determined by the sensor. Furthermore, any such error occurring after the position sensor is calibrated is not readily detectable.

An analog optical position-indicating sensor is disclosed in U.S. Pat. No. 4,769,536 that attempts to compensate for this type of error. In this sensor, light at three different wavelengths is conveyed through a common optical fiber and directed through an encoded track disposed on a movable element. The encoded track is completely transparent to light at two of the wavelengths, but its transmissivity with respect to the third wavelength varies with the position of the encoded track. Light transmitted through the encoded track is conveyed through another optical fiber to two optical couplers disposed adjacent to three light sensors. The optical couplers divide the light into three separate beams, each comprising light at one of the three wavelengths, and direct these beams to the light sensors, which determine the relative intensities of the light at each wavelength. By monitoring the ratio of the various light beam intensities at the light sensors, modulation of light intensity at the third wavelength by the encoded track, and thus, the position of the element can be determined independently of any spurious variations in light intensity that occur in the system. However, since wavelength discrimination occurs at the encoded track, any variation in its transparency with respect to the two wavelengths that it is not intended to modulate (e.g., due to contamination by dirt) causes an error in the position measured by this device. Because the area of the encoded track is typically relatively small, it is more susceptible to the effects of contamination than a larger encoded area would be. A further disadvantage of this optical position sensor is its relative complexity.

In a commonly assigned U.S. Pat. application Ser. No. 574,203, filed on Aug. 28, 1990, now U.S. Pat. No. 5,068,528, an encoded surface position sensor is disclosed that compensates for variations in the intensity of light signals propagating through the sensor system due, for example, to contamination of optical surfaces in the sensor or variations in the source. This position sensor uses light at a reference wavelength and at a test wavelength that propagate along a common optical path until separated by an interference filter. A test beam comprising light at the test wavelength is transmitted through the interference filter toward an encoded surface. The encoded surface reflects a portion and transmits another portion of the test beam. The transmitted portion of the test beam is then reflected by a mirror, which is disposed adjacent to a surface of a rotatable disk or a linear encoder opposite from that on which the encoded surface is applied. The mirror reflects the transmitted portion of the test beam along a first optical path, while the portion of the test beam that is reflected by the encoded surface travels along a second optical path. The relative transmissivity/reflectivity of the encoded surface varies with its position in respect to the point on the surface at which the test beam is incident, thereby varying the intensity of the reflected and transmitted portions of the test beam in a predefined manner. A reference beam comprising light at the reference wavelength is reflected by the interference filter along a reference path and is then split by a beam splitter. A portion of the reference beam is transmitted toward a mirror, which reflects it back toward the interference filter. The interference filter reflects this portion of the reference beam along the first optical path. The portion of the reference beam reflected by the beam splitter is also reflected by the interference filter so that it travels along the second optical path with the portion of the test beam reflected by the encoded surface. Light traveling along the first and the second optical paths is conveyed by optical fibers to a sensor assembly that determines the relative intensities of the transmitted and the reflected portions of the test and reference beams to define the position of the encoded surface, thereby compensating for light losses in the optical fibers and other parts of the system.

One of the problems with the optical position sensor just described is its sensitivity to differences in the optical losses occurring in the test and reference light paths. Since both the reference and test light beams are split apart and then recombined, the elements of the optical system that define their paths must be precisely aligned. Although optical trimming elements can be employed to correct minor alignment problems that arise during the manufacture of the sensor, use of such corrective measures complicates the assembly process and increases its cost.

It is also desirable to incorporate some form of self-monitoring to determine if an optical sensor is operating properly. This type of fault detection can be accomplished, for example, by monitoring the sum of the transmitted and reflected light from the sensor to determine if the sum of these two components remains substantially constant. In a reflective-only encoder configuration, this self-monitoring function can be implemented by providing two encoded tracks with complementary characteristics. A further object of at least one embodiment of this invention is to provide a determination of whether the optical sensor is functioning properly, where such determination is generally independent of slight misalignment of the paths that are followed by the test and reference beams. These and other objects and advantages of the invention will be apparent from the attached drawings and the Detailed Description of the Preferred Embodiment that follows.

SUMMARY OF THE INVENTION

In accordance with the present invention, a sensor for monitoring the position of an element comprises a first light source producing light of a first wavelength and a second light source producing light of a second wavelength. A reflective surface is disposed on the element and has a reflectance that varies over the surface so that relative motion between the element and a monitoring position encodes the position of the reflective surface in respect to the monitoring position. First light transmission means are provided for conveying the light of the first and the second wavelengths toward the reflective surface, generally along a common optical path. Wavelength selective reflective means are disposed in contact with the element, in close proximity with the surface, for reflecting light of the first wavelength and transmitting light of the second wavelength. Second light transmission means are operative to receive light of the first and second wavelengths that is reflected from the surface and transmit that light to a remote location, generally along a common optical path. At the remote location, light responsive means produce a first signal and a second signal, respectively indicating the intensity of the light of the first and the second wavelengths that is conveyed to the remote location through the second light transmission means. Reflectance of the light at the second wavelength by the wavelength selective means causes the second signal (which is indicative of the intensity of the light of the second wavelength) to be substantially independent of the relative position of the element. However, the signal indicative of the intensity of the light at the first wavelength varies with the relative position of the element in respect to the monitoring position. A ratio of the first and the second signal provides an indication of the relative position of the element that is generally insensitive to a misalignment of the first and the second light transmission means with respect to the reflective surface, since losses common to the light of both the first and the second wavelengths do not change the ratio.

Preferably, the wavelength selective means comprise an interference filter. This interference filter is applied between the first light transmission means and the reflective surface so that the light of the second wavelength transmitted by the first light transmission means is reflected into the second light transmission means and does not reach the reflective surface. Alternatively, the reflective surface is disposed between the first light transmission means and the interference filter, so that light of the second wavelength is reflected from both the reflective surface and the interference filter into the second light transmission means, but only the light of the first wavelength that is reflected from the reflective surface enters the second light transmission means.

In one form of the sensor, the element is generally transparent and the reflective surface and the wavelength selective means are applied to an opposite side of the element from where the first and the second light transmission means are disposed, so that the light of the first and the second wavelengths passes through the element before encountering the reflective surface. The reflective surface preferably comprises a plurality of reflective dots applied with varying density and/or size as a function of their position on the element; however, other types of variable reflectance surfaces can be used, such as other geometric reflective patterns, or a thin film having a thickness and/or composition that varies in reflectance with the relative position of the element.

The wavelength selective means are adherently attached to the reflective surface and can comprise a plurality of quarter-wavelength optical coatings that are applied to the reflective surface. In another form of the invention, the plurality of quarter-wavelength optical coatings are applied to a surface of the element, and the reflective surface is then applied over the plurality of quarter-wavelength optical coatings.

The sensor can further comprise splitter means for splitting the light of the first and the second wavelengths that is transmitted by the first light transmission means into two paths. The reflective surface then comprises two spaced-apart areas having reflectances that vary inversely in respect to the light reflected as the position of the element changes relative to the monitoring position. Each path followed by the light of the first and the second wavelengths intersects one of the areas. The second light transmission means convey light of the first wavelength that is reflected in a first test beam by the reflective surface in one area and light reflected in a second test beam by the reflective surface of the other area. In addition, the second light transmission means convey light of the second wavelength that is separately reflected from these two areas in a first reference beam and a second reference beam, respectively. As relative motion occurs between the element and the monitoring position, intensities of the first and the second test beams vary inversely, while a sum of a first ratio of the intensities of the first test beam and the first reference beam, and a second ratio of the intensities of the second test beam and the second reference beam, remains substantially constant. The light responsive means are further operative, in this embodiment, to detect a fault in the sensor if the sum of the first and second ratios does not remain substantially constant.

The sensor can further comprise means for collimating the light of the first and the second wavelengths that exits the first light transmission means. Likewise, the sensor can further comprise means for focusing the light of the first and the second wavelengths into the second light transmission means.

DETAILED DESCRIPTION OF THE PREFERRED EMBODIMENT

Figure 1:
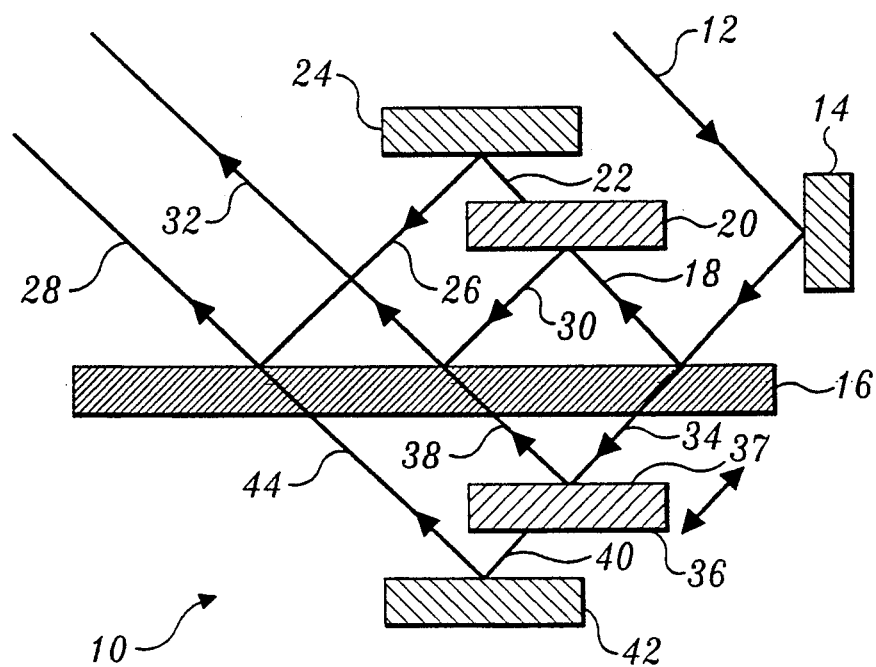
FIG. 1 is an elevational view of a prior art optical position sensor that uses a test beam and a reference beam.

Referring to FIG. 1, the encoded surface position sensor disclosed in commonly assigned U.S. patent application Ser. No. 574,203, which is discussed in the Background of the Invention, is shown generally at reference numeral 10. Position sensor 10 is provided with a source of light (not shown) that produces light having a reference wavelength and a test wavelength, which propagates along a common optical path 12 toward a mirror 14. Both the reference and test wavelength light are reflected from mirror 14 toward an interference filter 16, which reflects light at the reference wavelength along a reference path 18 toward a beam splitter 20. A predetermined portion of the light at the reference wavelength is transmitted through beam splitter 20, along a path 22 that is directed toward a mirror 24. This portion of the reference wavelength light is reflected from mirror 24 along a reflected reference path 26, back toward interference filter 16. From interference filter 16, the portion of the reference wavelength light reflected from mirror 24 is again reflected, along a first signal path 28. The other portion of the reference wavelength light that is reflected from beam splitter 20 travels along a path 30 toward interference filter 16 and is reflected by it along a second signal path 32.

Light of the test wavelength is transmitted through interference filter 16 along a path 34, which is directed toward an encoded surface 37, applied to an element 36. Encoded surface 37 has a varying reflectance, depending upon the relative position of element 36 in respect to the point at which light of the test wavelength is incident. As a result, light at the test wavelength is reflected along a path 38, through interference filter 16, and along second signal path 32, with an intensity modulated by the relative position of the encoded surface. The portion of light at the test wavelength that is transmitted through element 36, i.e., not reflected from encoded surface 37, travels along a path 40 and is reflected from a mirror 42, which underlies element 36. Light at the test wavelength that is reflected from mirror 42 travels along a path 44, through interference filter 16, and along first signal path 28. First signal path 28 and second signal path 32 are directed toward light detectors (not shown). The relative position of element 36 is then determined from the ratios of the intensities of light at the test and reference wavelengths traveling along first signal path 28 and second signal path 32, respectively. The difference between those two ratios is divided by their sum to determine the relative encoder position.

Prior art position sensor 10 provides an accurate determination of the relative position of element 36 only if interference filter 16, encoded surface 37, mirror 42, beam splitter 20, and mirror 24 remain in substantially parallel alignment with each other. In one form of this prior art sensor, an error in the alignment of these elements of less than one arc minute can produce up to one percent error in the determination of the relative position of element 36.

Figure 2:
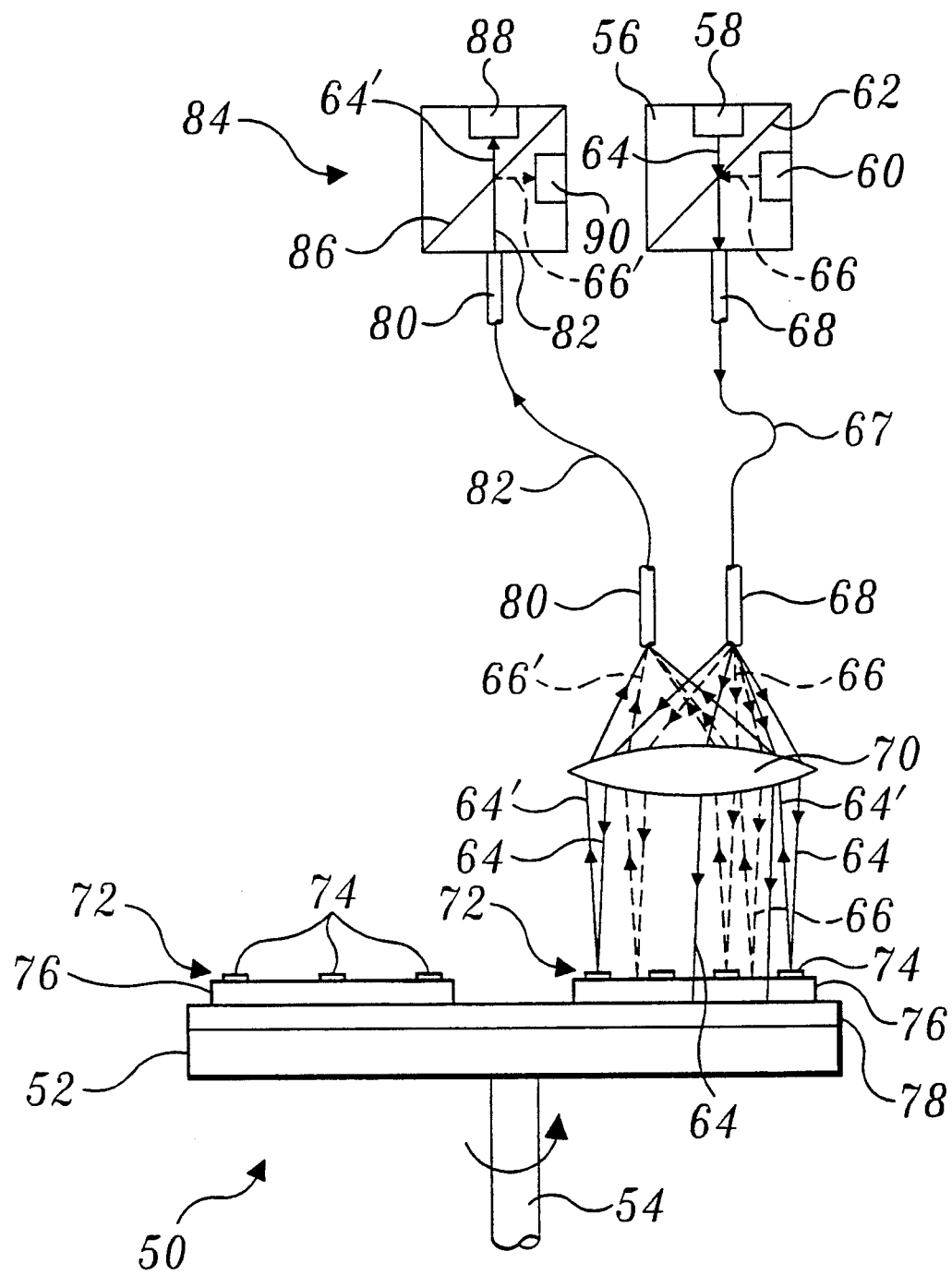
FIG. 2 is an elevational view of a first embodiment of an alignment insensitive optical position sensor in accordance with the present invention.

A first embodiment of the present invention is shown generally at reference numeral 50 in FIG. 2. Alignment insensitive position sensor 50 is used to monitor the angular position of a rotatable disk 52, which is driven by a shaft 54 on which it is mounted. Position sensor 50 includes a light source 56 that comprises a first light emitting diode (LED) 58 and a second LED 60. A white light source in combination with suitable filters (neither shown) could also be used to provide light of two different wavelengths. LED 58 emits a test light 64 falling within a narrow band of wavelengths centered about 730 nanometers, while LED 60 emits a reference light 66 within a narrow band of wavelengths centered about 865 nanometers. The ratio of the optical powers of the two LEDs is known or empirically determined in the preferred embodiment. Alternatively, detectors (not shown) can be provided at light source 56 to monitor the ratio of the optical power produced by LEDs 58 and 60. Light source 56 includes an angled interference filter 62, which transmits the test light and reflects the reference light into an optical fiber 68. Optical fiber 68 conveys the test and reference light along a common optical path 67 to a point adjacent rotatable disk 52. As will be apparent to those of ordinary skill in the art, the present invention is not in any way limited to the use of LEDs as a light source or the particular wavelengths recited above for the test and reference light emitted by light source 56, since different types of sources and different wavelengths can readily be used without departing from the spirit of the invention.

Reference light 66 and test light 64 exit the end of optical fiber 68 along diverging paths that are directed toward a lens 70. While passing through lens 70, the test and reference light is collimated and directed toward an encoded track 72, which is applied to the upper surface of rotatable disk 52. Encoded track 72 includes a plurality of metallic dots 74 that are spaced apart, overlying an interference filter 76. The size and/or density of metallic dots 74 varies with angular position around shaft 54 such that the reflected intensity of the test light from the metallic dots changes with the angular position of rotatable disk 52 as it rotates. Metallic dots 74 are photolithographically formed from a metallic layer overcoating interference filter 76 and preferably comprise aluminum, gold, or other highly reflective material formed in a pattern of varying reflectance as a function of position on the rotatable disk. Both test light 64 and reference light 66 are reflected from metallic dots 74. However, interference filter 76 selectively transmits test light 64 and reflects reference light 66, because of the wavelengths of the test and reference light. Consequently, virtually all of reference light 66 incident on encoded track 72 is reflected either from metallic dots 74 or from interference filter 76. However, only the portion of test light 64 that is incident on metallic dots 74 is reflected; the remainder of test light 64 that misses metallic dots 74 and is incident on the underlying surface passes through interference filter 76 and is absorbed by an absorption layer 78. Alternatively, absorption layer 78 may be omitted so that the portion of test light 64 not reflected from metallic dots 74 is simply transmitted through a transparent rotatable disk 52.

Test light reflected from metallic dots 74 is identified by reference numeral 64' and reference light reflected either from metallic dots 74 or from interference filter 76 is identified by reference numeral 66'. The reflected test light and reflected reference light are focused by lens 70 into the end of an optical fiber 80, which conveys the combined reflected test and reference light along a path 82 toward a light detector 84. Light detector 84 includes an interference filter 86, which selectively transmits the test light toward a photodetector 88, but reflects the reference light toward a photodetector 90. Photodetectors 88 and 90 produce electrical signals respectively indicative of the intensity of the reflected test light 64' and reflected reference light 66'. Rotation of rotatable disk 52 on shaft 54 modulates the intensity of the reflected test light and thus, the intensity of the electrical signal produced by photodetector 88. However, the electrical signal produced by photodetector 90 remains generally constant as rotatable disk 52 turns, since reflected reference light 66' remains relatively constant in intensity, whether reflected from metallic dots 74 or interference filter 76.

In the preferred embodiment, interference filter 76 comprises a plurality of quarter-wavelength optical coatings, selected for their ability to reflect the reference light, i.e., to reflect the narrow band of wavelengths centered about 865 nanometers in the preferred embodiment, while transmitting test light 64.

Figure 3:
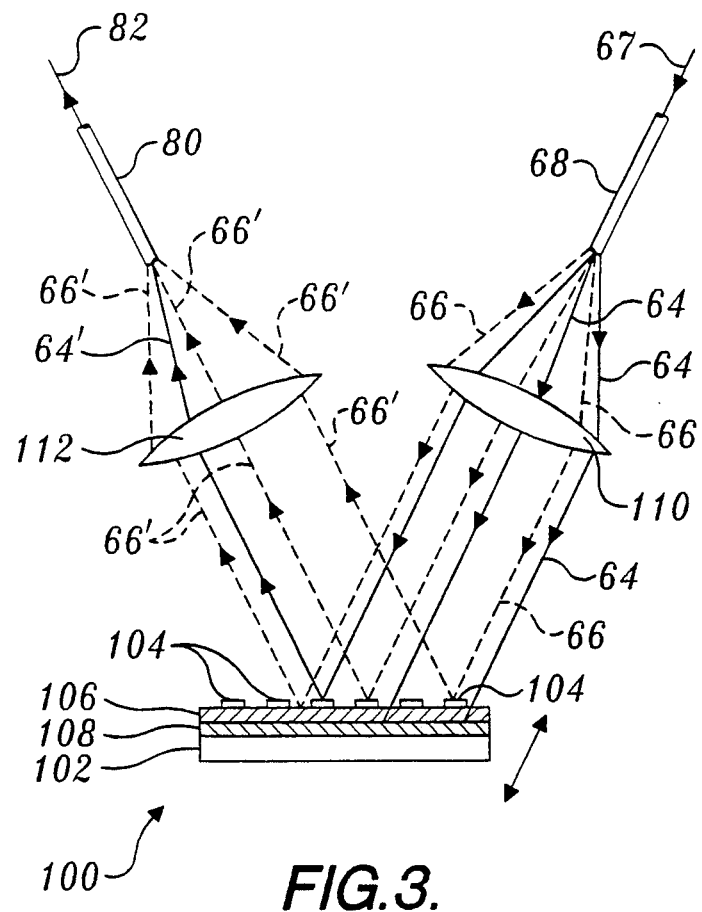
FIG. 3 is an elevational view of a second embodiment of the alignment insensitive optical sensor.

In FIG. 3, an alignment insensitive position sensor 100 is shown, which is used to monitor the position of an encoded surface 102 as it moves linearly in respect to test light 64 and reference light 66. As in position sensor 50, test light 64 and reference light 66 are conveyed along path 67 through optical fiber 68, diverging from the end of the optical fiber toward a lens 110. Lens 110 collimates the test light and reference light, directing the collimated light toward encoded surface 102. The encoded surface comprises a plurality of metallic dots 104 that overlie an interference filter 106. The density and/or size of metallic dots 104 varies longitudinally along the length of encoded surface 102, so that the portion of test light 64 reflected from the metallic dots varies as the encoded surface moves in the direction generally indicated by the arrow in FIG. 3. However, in position sensor 100, reflected test light 64' and reflected reference light 66' are directed toward a lens 112 that focuses the reflected test and reference light toward the end of optical fiber 80, which conveys the test and reference light along a common path 82 toward the light detector. To simplify the illustration, neither the light source nor the light detector are shown in FIG. 3. Test light 64 that is not reflected from metallic dots 104 is transmitted through interferece filter 106 and absorbed by an absorption layer 108. Alternatively, as noted in respect to the previous embodiment, the portion of test light 64 that is not reflected from the metallic dots can be transmitted through the encoded surface, in which case, absorption layer 108 is not required.

One of the primary advantages of position sensor 50 or 100 compared to prior art position sensor 10 is the relative insensitivity of the present invention to alignment of the elements comprising the position sensor. For example, in respect to position sensor 100, the alignment of lenses 110 and 112 is not critical. Even if the two lenses are not perfectly aligned, both the test and reference light are affected equally by the misalignment so that any signal loss is factored out in the determination of the position of encoded surface 102. The same advantage applies to position sensor 50 in respect to possible misalignment of lens 70. Since the surfaces from which the test light and the reference light are reflected, i.e., the top of metallic dots 74/104 and interference filter 76/106 are almost coplanar, misalignment between these surfaces is almost nil. Consequently, unlike prior art position sensor 10, the present invention is generally not subject to the effects of misalignment between the surfaces from which the test and reference lights are reflected.

Mathematical Description

Referring back to FIG. 2, photodector 88 in light detector 84 develops an electrical signal in response to the test light 64', which can be represented by the following equation:

$$V_1 = LP_1G_1\{R_{m1}A(x) + R_{f1}[1 - A(x)]\} \tag{1}$$

where $V_1$ is the amplitude of the electrical signal produced by photodetector 88, L is the attenuation factor of optical fiber 80, $R_{m1}$ is the reflectivity (at the test light wavelength) of the metallic dots 74 that comprise the encoded track 72, $A(x)$ is the fraction of the illuminated area on the encoded track occupied by the metallic dots ($0 < A(x) < 1$), $R_{f1}$ is the reflectivity of interference filter 76 at the test wavelength, $P_1$ is the power of the reflected test light 64', and $G_1$ is the gain of photodetector 88 at the wavelength of the test light. Similarly, the electrical signal produced by photodetector 90 is described by the following equation:

$$V_2 = LP_2G_2\{R_{f2}[1 - A(x)] + R_{m2}A(x)\} \tag{2}$$

where the subscript 2 used on each of the terms refers to reflected light 66' at the reference wavelength and the terms of Equation (2) otherwise have the same definition as the corresponding terms with subscript 1 in Equation (1). The ratio of these two electrical signals is given by:

$$\frac{V_1}{V_2} = \left(\frac{P_1G_1}{P_2G_2}\right)\left(\frac{R_{f1} + A(x)(R_{m1} - R_{f1})}{R_{f2} + A(x)(R_{m2} - R_{f2})}\right) \tag{3}$$

Under ideal conditions, $R_{f1}=0$, $R_{f2}=R_{m1}=R_{m2}=1$, producing the resulting simple expression:

$$\frac{V_1}{V_2} = \left(\frac{P_1 G_1}{P_2 G_2}\right) A(x) \tag{4}$$

The function $A(x)$ is known, since it was built into the design of the dot pattern. The two electrical signals $V_1$ and $V_2$ represent measurements, and the ratio $P_1G_1/P_2G_2$ can be obtained from empirical measurements, so that sufficient information is known to allow the desired unknown, x, to be determined. If the filter and metal films are not "perfect," the shaft angle, x, can still be extracted from Equation (3), provided that the reflectivities of metallic dots 74 and interference filter 76 at the two wavelengths are known.

Figure 8:
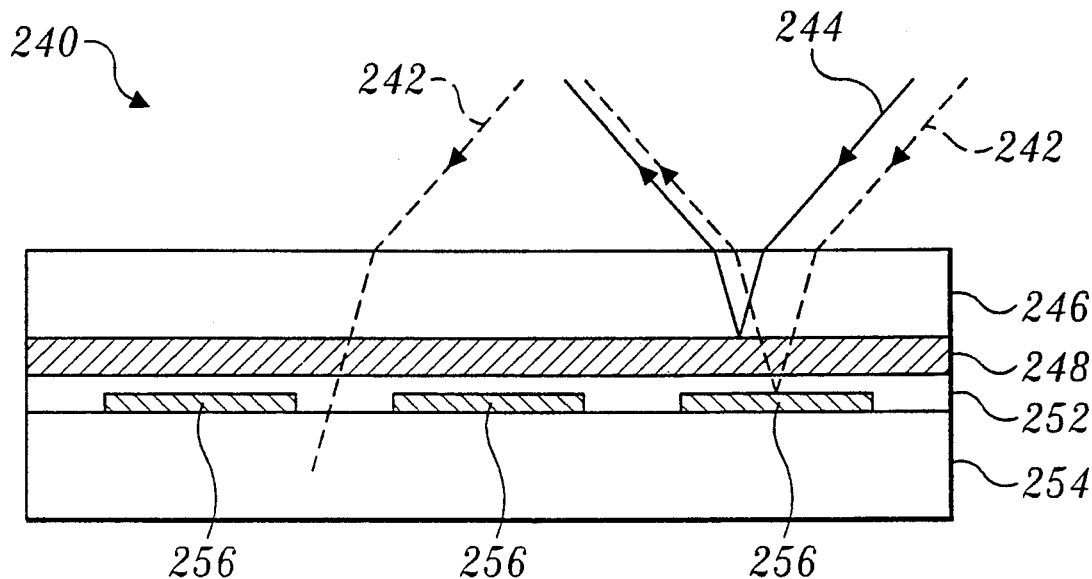
FIG. 8 is a cross-sectional elevational view of one form of an optical encoder element monitored by the alignment insensitive position sensor.
Figure 9:
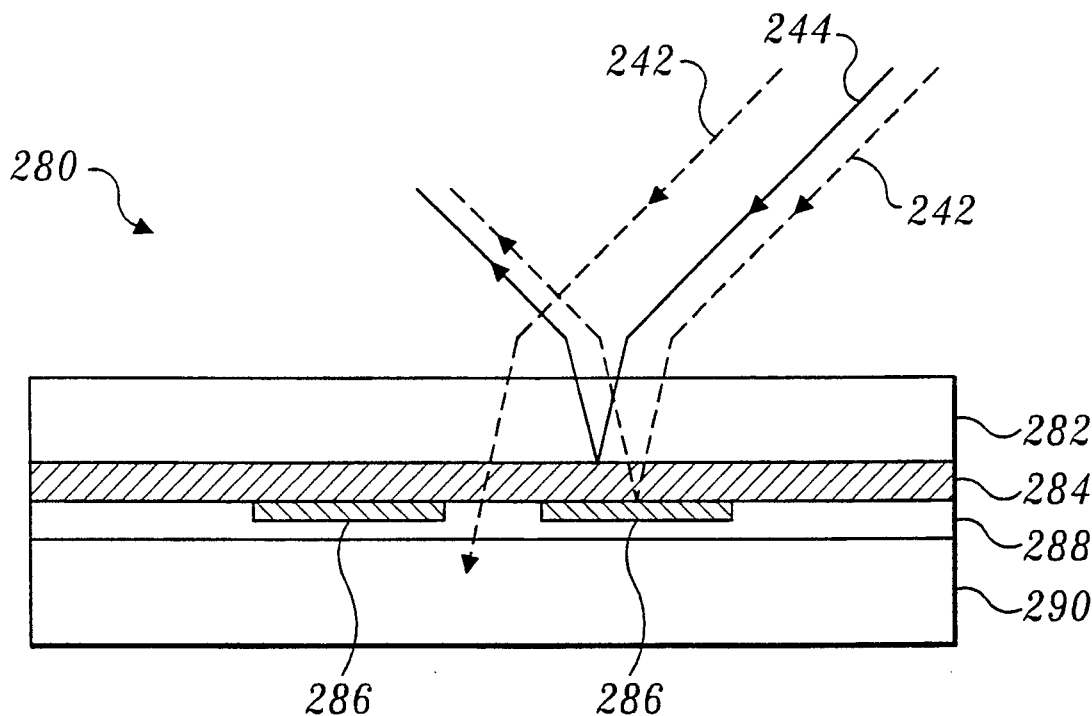
FIG. 9 is a cross-sectional elevational view of another form of an optical encoder element monitored by the alignment insensitive position sensor.

Slightly different optical configurations for two other embodiments of an optical encoder for use with the present invention are shown at reference numerals 240 and 280 in FIGS. 8 and 9, respectively. These two optical encoders differ from the first with regard to the disposition of the interference filter relative to the metallic dot pattern and with regard to other differences that are described in greater detail below. When used with either of optical encoders 240 or 280, the ratio of the electrical signals produced by the two detectors that respond to light reflected from the encoded surfaces of the optical encoders is given by:

$$\frac{V_1}{V_2} = \left(\frac{P_1 G_1}{P_2 G_2}\right)\left(\frac{A(x)R_{m1}(1 - R_{f1})^2 + R_{f1}}{A(x)R_{m2}(1 - R_{f2})^2 + R_{f2}}\right) \tag{5}$$

Optical encoders 240 and 280 and similar optical configurations tend to provide a more linear $V_1/V_2$ ratio, since the denominator term $(1-R_{f2})2$ in Equation (5) is typically a much closer to 0 than the denominator term $(R_{m2}-R_{f2})$ in Equation (3).

Self-Monitoring Optical Position Sensor

One of the disadvantages of alignment insensitive position sensors 50 or 100 is their inability to detect a gross misalignment or other catastrophic failure of the position sensor. For example, in respect to position sensor 100, if either lens 110 or lens 112 is so misaligned that test light 64 and reference light 66 are not directed toward the encoded surface, or if reflected test light 64' an reference light 66' are not properly focused toward the end of optical fiber 80, a determination of the position of encoded surface 102 could be substantially in error. One way to detect such gross failures of the position sensor is to provide two encoded tracks having symmetric but inverse reflectivity functions.

Figure 4:
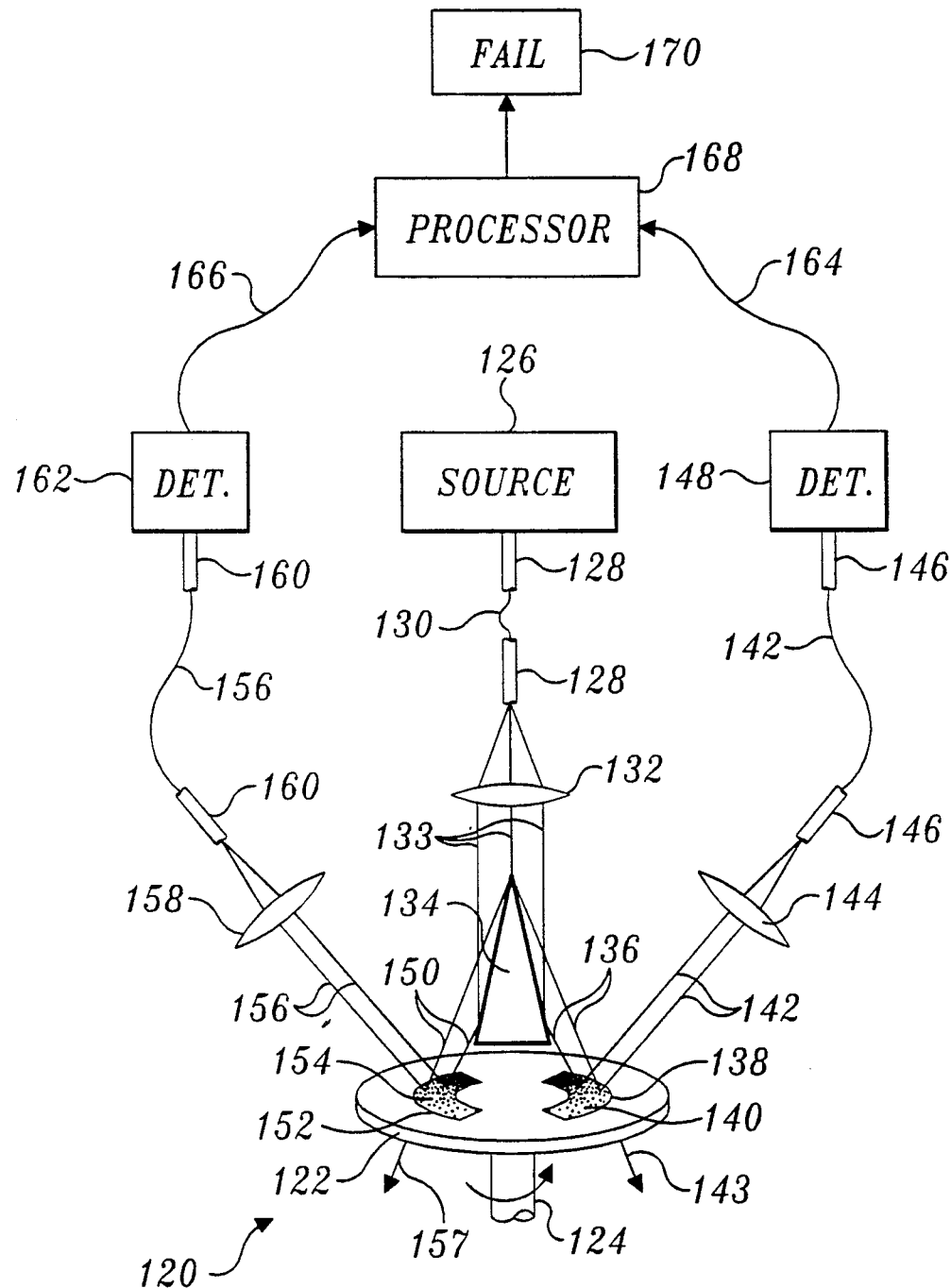
FIG. 4 is an isometric schematic view of a third embodiment of the alignment insensitive optical sensor.

In FIG. 4, an alignment insensitive position sensor 120 is shown that is capable of self-monitoring its operation, to validate the determination of the position of a rotatable disk 122, which is attached to a drive shaft 124. Position sensor 120 includes a light source 126 that provides test light and reference light at substantially different wavelengths, just as explained above in respect to the first two embodiments. The test and reference light are conveyed through an optical fiber 128 along a path 130 toward a lens 132. Lens 132 collimates the light emerging from optical fiber 128 along parallel paths 133, which are directed toward a prism 134. In position sensor 120, the test and reference light are not separately shown in order to simplify FIG. 4, however, it should be apparent that light following paths 133 comprises both the test light and the reference light, just as explained with respect to the first two embodiments.

Prism 134 splits the test and reference light into two divergent paths. A first path 136 is directed toward an encoded track 138, comprising a plurality of metallic dots 140, spaced apart in a continuously varying array so that the reflectivity of encoded track 138 varies with respect to the test light as the angular position of the rotatable disk changes. Encoded track 138 also comprises an interference filter underlying metallic dots 140, which reflects the reference light, but transmits the test light along paths 143 and 157. As rotatable disk 122 rotates, the proportion of the test light reflected from the metallic dots changes, while the total intensity of the reference light reflected from the metallic dots and from the interference filter remains substantially constant. Both the reflected test light and reflected reference light follow a path 142 that is directed toward a lens 144, which focuses this light toward an optical fiber 146. Optical fiber 146 conveys the reflected light, both test and reference, along a path 142 to a detector 148.

In a similar fashion, prism 134 directs part of the light following path 133 along a second path 150 toward an encoded track 152. Encoded track 152 also comprises a plurality of metallic dots 154 that are applied to an interference filter (not separately shown). On encoded track 152, the density and/or size of metallic dots 154 varies in an inverse relationship to the variation in the size and/or density of metallic dots 140 on encoded track 138. Test light reflected from metallic dots 154 and reference light reflected from the metallic dots and from the interference filter travel along a path 156 toward a lens 158, which focuses the reflected light into the end of an optical fiber 160. Optical fiber 160 conveys the reflected test and reference light along a path 156 to a detector 162.

Detectors 148 and 162 each produce electrical signals proportional to the intensity or power of the reflected test and reference light, which are conveyed along electrical leads 164 and 166, respectively, to a processor 168. Processor 168 preferably comprises an analog circuit that determines the ratio of reflected test light to reflected reference light at light detector 148 and the ratio of reflected test light to reflected reference light at detector 162 (based on their corresponding electrical signals). Further, processor 168 determines the sum of these two ratios, which when normalized by the ratio of the power of the test and measurement light sources, should remain constant, i.e., the sum of the two ratios is proportional to a constant value. Any variation in this constant value indicates that the position sensor is experiencing a fault condition. In response to the detection of a fault condition, processor 168 produces a failure signal, which is applied to a fault indicator 170. This indicator may comprise an audible and/or visual alarm to alert an operator that the position sensor has detected a fault within itself.

Although the illustration in FIG. 4 implies that prism 134 splits the test and reference light traveling along paths 133 evenly between paths 136 and 150, the splitting ratio need not be equal.

Position sensor 120 also lends itself to schemes in which duplex and triplex pairs of tracks are provided on a surface to determine its position with respect to a monitoring point. In such devices, two or three pairs of symmetrically inverted encoded tracks are applied to an element, thereby providing redundancy in the event that one of the position sensor detectors should fail.

Figure 5:
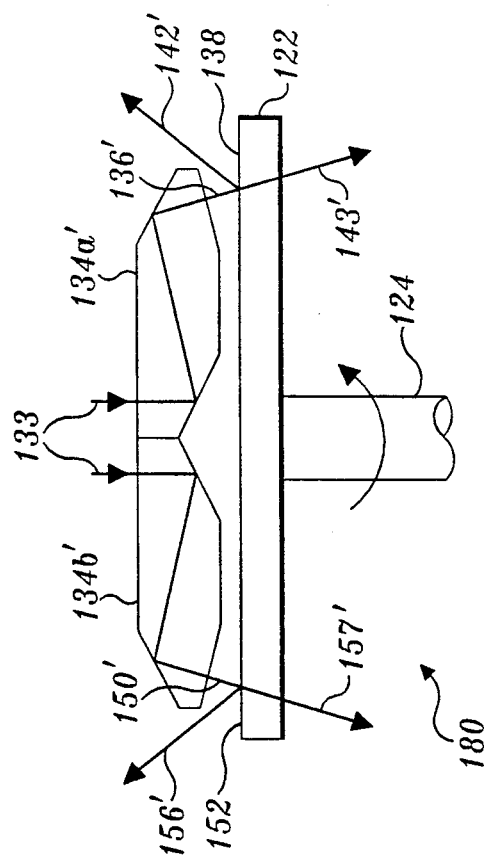
FIG. 5 is an elevational view of a modified form of the third embodiment of the alignment insensitive optical position sensor.

Instead of a single prism 134, dual prisms 134a' and 134b' can be provided for splitting the test and reference light that is directed along paths 133, as shown for a position sensor 180 in FIG. 5. Prisms 134a' and 134b' internally reflect the test and reference light so that it exits the prisms toward the encoded tracks 138 and 152 along paths 136' and 150', respectively. The test light and reference light reflected from the encoded tracks is then reflected along paths 142' and 156' toward lenses 144 and 158 (not shown in FIG. 5), while the transmitted test light continues through rotatable disk 122 along paths 143' and 157'.

Figure 6:
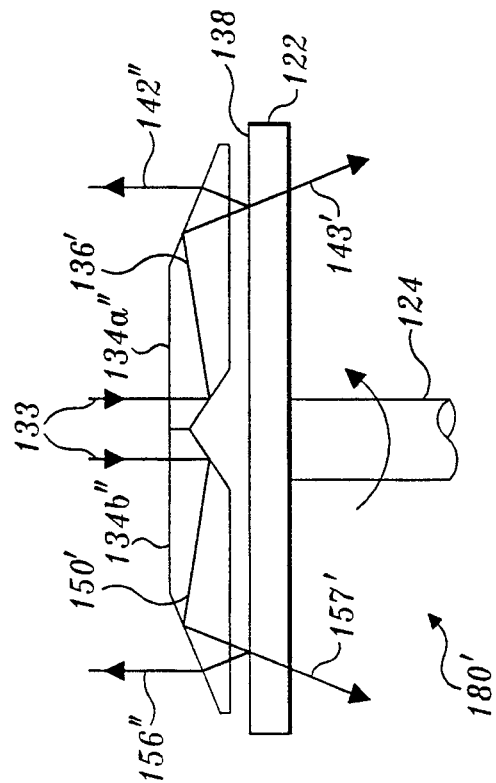
FIG. 6 is an elevational view of another modified form of the third embodiment of the alignment insensitive optical position sensor.

One of the disadvantages of position sensors 120 and 180 is that the reflected test and reference light travels along paths that are not parallel with the incoming test and reference light, i.e., with paths 133. FIG. 6 shows an alignment insensitive position sensor 180', which is much like position sensor 180. However, in position sensor 180', test light and reference light reflected from encoded tracks 138 and 152 reenter prisms 134a'' and 134b'', where the light is redirected along paths 142'' and 156'' that are generally parallel to paths 133. Position sensor 180' is thus a more compact configuration. Use of the common optical grade crown glass known as BK7 for prisms 134a'' and 134b'', at the wavelengths of the test and reference light used in the preferred embodiments (730 and 865 nanometers, respectively), results in an angular displacement of the paths 142'' and 156'' from vertical of approximately 4.4 arc minutes, which is generally acceptable for most applications.

Figure 7A:
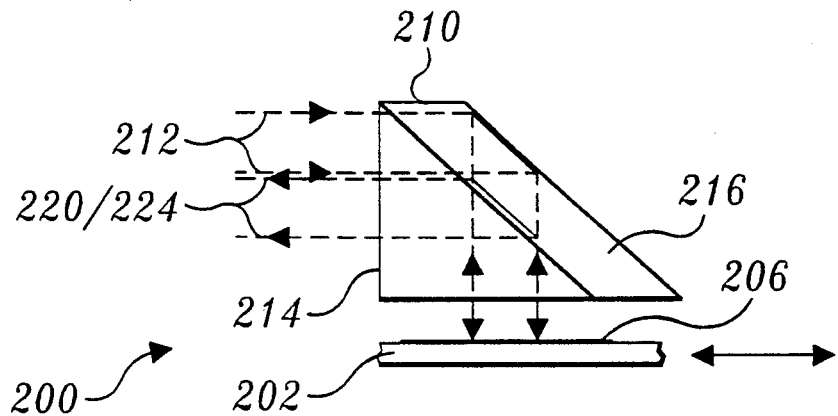
FIGS. 7A, 7B, and 7C illustrate a beam splitter used in the third embodiment of the alignment insensitive optical position sensor, in elevational side view, plan view, and elevational rear view, respectively.
Figure 7B:
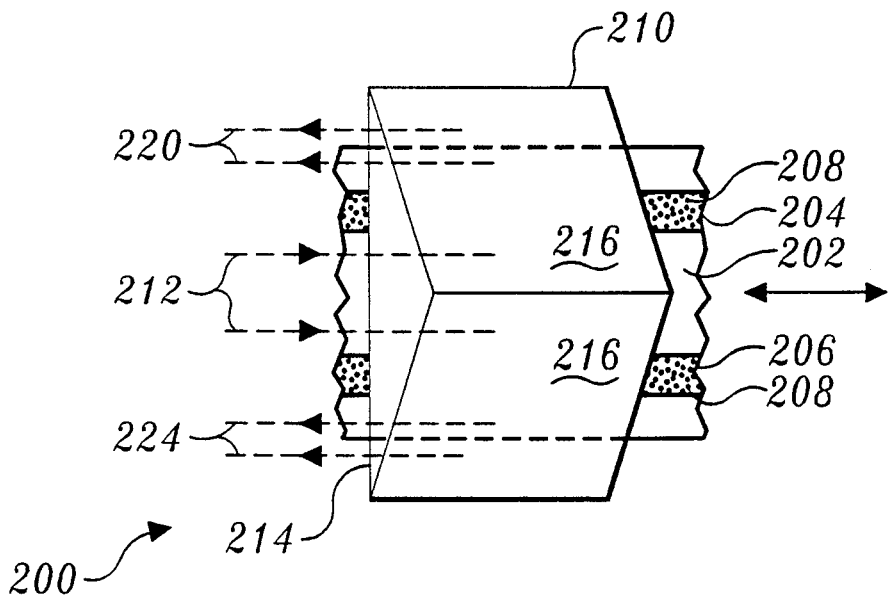
Figure 7C:
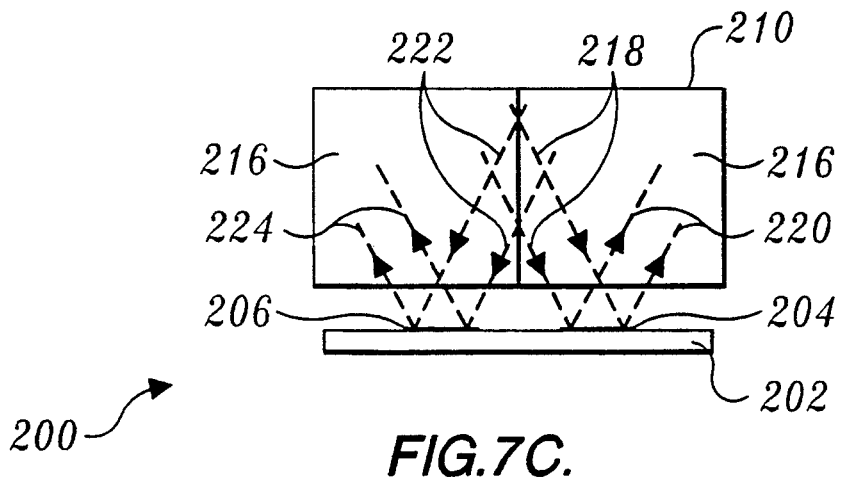

In some applications, it may be important that the test light and reference light enter the sensor from the side and that the reflected test light and reference light exit the sensor from the same side along paths that are generally parallel to the surface being monitored. Such an arrangement may be required, for example, to minimize the height of the position sensor above the surface being monitored, where clearance above the surface is limited. FIGS. 7A through 7C show an alignment insensitive position sensor 200 that uses a roof prism 210 for splitting and directing the test light and reference light toward two longitudinally extending encoded tracks 204 and 206, and for redirecting the test light and reference light reflected from the encoded tracks back along paths parallel with the input test light and reference light. The test light and reference light follows a path 212 that is transversely incident on a rear surface 214 of roof prism 210. The test light and reference light is internally reflected from front faces 216 of the roof prism, which form an angle of approximately 120° in respect to each other and meet along a line that is at an angle of approximately 45° to the base of the roof prism. Internal reflection from faces 216 splits the test and reference light into two paths 218 and 222 that are directed down toward encoded tracks 204 and 206. Each of the two encoded tracks comprise a plurality of metallic dots 208 having a varying density and/or size so that the reflectivity of encoded tracks 204 and 206 varies inversely, longitudinally along the length of an element 202 to which the encoded tracks are applied. In position sensor 200, as well as in each of the previously disclosed embodiments of the alignment insensitive position sensor, the position of the encoded surface (or track) is determined with respect to the test light and reference light. Impliedly, either the position sensor or the encoded surface, or both, can be in motion, since the sensor simply determines the position of the encoded surface with respect to its own reference point.

As shown best in FIG. 7C, test and reference light reflected from encoded tracks 204 and 206 follows paths 220 and 224, respectively, into roof prism 210, where the light is directed back through rear surface 214, generally parallel with paths 212.

FIG. 8 shows the alternative embodiment for optical encoder 240 discussed briefly above. In this embodiment, test light 242 and reference light 244 are directed through a transparent substrate 246 towards an interference filter 248. Reference light 244 is reflected from interference filter 248 and passes back through transparent substrate 246. Test light 242 passes through transparent substrate 246, interference filter 248, through an underlying transparent layer 252, and is either absorbed by an absorbing substrate 254 or is reflected from the metallic dots 256. Absorbing substrate 254 preferably comprises a light-absorbing glass or a transparent glass having its back surface coated with an absorbing and/or light scattering material.

In one method for forming optical encoder 240, interference filter 248 is deposited on transparent substrate 246. Metallic dots 256 are applied as a front surface reflector on absorbing substrate 254, and the transparent and absorbing substrates are then bonded together using transparent layer 252.

In FIG. 9, optical encoder 280 is shown. In this device, test light 242 passes through a transparent substrate 282, an interference filter 284, and is either reflected from metallic dots 286, or passes through an underlying transparent layer 288 and is absorbed by an absorbing substrate 290. Like absorbing substrate 254, absorbing substrate 290 can comprise a substantially transparent material having a back surface coated with an absorbing or scattering material. Alternatively, absorbing substrate 290 and transparent layer 288 may be omitted if any portion of test light 242 that misses the metallic dots is not reflected back into the optical system. Reference light 244 is reflected from interference filter 284 back through transparent substrate 282.

In one method of forming optical encoder 280, interference filter 284 is deposited on substrate 282. Metallic dots 286 (or other reflective coating or pattern of reflectivity) are then fabricated on interference filter 284 as a second surface reflector. If used, absorbing substrate 290 is then bonded to substrate 282 using transparent layer 288.

This invention has been disclosed in respect to several preferred embodiments and modifications thereto. Those of ordinary skill in the art will appreciate that further modifications may be made to the invention within the scope of the claims that follow. Accordingly, it is not intended that the scope of the invention in any way be limited by the disclosure, but instead that it be determined entirely by reference to the claims.

The invention in which an exclusive property or privilege is claimed is defined as follows:

1. A sensor for monitoring a relative spatial position of an element, comprising:
   a. a first light source producing light of a first wavelength;
   b. a second light source producing light of a second wavelength;
   c. a reflective surface disposed on the element, the reflective surface having a reflectance that varies due to relative movement between the element and a monitoring position to encode a position of the reflective surface in respect to the monitoring position;

d. first light transmission means for conveying the light of the first and second wavelengths toward the reflective surface, generally along a common optical path;

e. wavelength selective means, disposed in contact with the element, in close proximity with the surface, for reflecting light of the first wavelength and transmitting light of the second wavelength;

f. second light transmission means for receiving light of the first and the second wavelengths that is reflected from the surface and transmitting that light to a remote location, generally along a common optical path; and g. light responsive means, for producing a first signal and a second signal respectively indicative of the intensity of the light of the first and the second wavelengths that is conveyed to the remote location through the second light transmission means, reflectance of the light at the second wavelength by the wavelength selective means causing the second signal, which is indicative of the intensity of the light of the second wavelength at the remote location, to be substantially independent of the position of the element, while the signal indicative of the intensity of the light of the first wavelength at the remote location varies with the position of the element in respect to the monitoring position, a ratio of the first and the second signals providing an indication of the position of the element that is generally insensitive to a misalignment of the first and the second light transmission means with respect to the reflective surface, since losses common to the light of both the first and the second wavelengths do not change the ratio.

2. The sensor of claim 1, wherein the wavelength selective means comprise an interference filter.

3. The sensor of claim 2, wherein the interference filter is applied between the first light transmission means and the reflective surface so that the light of the second wavelength transmitted by the first light transmission means is reflected into the second light transmission means and does not reach the reflective surface.

4. The sensor of claim 2, wherein the reflective surface is disposed between the first light transmission means and the interference filter, so that light of the second wavelength is reflected from both the reflective surface and the interference filter into the second light transmission means, but only the light of the first wavelength that is reflected from the reflective surface enters the second light transmission means.

5. The sensor of claim 1, wherein the element is generally transparent and wherein the reflective surface and the wavelength selective means are applied to an opposite side of the element from where the first and the second light transmission means are disposed, so that the light of the first and the second wavelengths passes through the element before encountering the reflective surface.

6. The sensor of claim 1, wherein the reflective surface comprises a plurality of reflective dots applied with varying density and/or size as a function of position on the element.

7. The sensor of claim 1, wherein the wavelength selective means are adherently attached to the reflective surface.

8. The sensor of claim 1, wherein the wavelength selective means comprise a plurality of quarter-wavelength optical coatings that are applied to the reflective surface.

9. The sensor of claim 1, wherein the wavelength selective means comprise a plurality of quarter-wavelength optical coatings that are applied to a surface of the element and the reflective surface is then applied over the plurality of quarter-wavelength optical coatings.

10. The sensor of claim 1, further comprising splitter means for splitting the light of the first and second wavelengths that is transmitted by the first light transmission means into two paths, wherein the reflective surface comprises two spaced apart areas having reflectances that vary inversely in respect to the light reflected due to the relative movement between the element and the monitoring position, each path followed by the light of the first and the second wavelengths intersecting one of the areas, the second light transmission means being operative to convey:

a. a first test beam comprising the light of the first wavelength that is reflected by the reflective surface in one area;

b. a second test beam comprising the light of the first wavelength that is reflected by the reflective surface of the other area; and c. a first reference beam and a second reference beam comprising the light of the second wavelength that is reflected respectively from a different one of the two areas, whereby as relative movement occurs between the element and the monitoring position, intensities of the first and the second test beams vary inversely, while a sum of:

i. a first ratio of the intensities of the first test beam and the first reference beam; and ii. a second ratio of the intensities of the second test beam and the second reference beam remains substantially constant.

11. The sensor of claim 10, wherein the light responsive means are further operative to detect a fault in the sensor if a value proportional to the sum of the ratios does not remain substantially constant.

12. The sensor of claim 1, further comprising means for collimating the light of the first and the second wavelengths that exits the first light transmission means.

13. The sensor of claim 1, further comprising means for focusing the light of the first and the second wavelengths into the second light transmission means.

14. An alignment insensitive optical position sensor for monitoring a position of an element in respect to a monitoring point, comprising:

a. a source of a reference light;

b. a source of a test light, the reference light and the test light having substantially different wavelengths;

c. a reflective material that is applied to a generally planar surface of the element so as to provide a reflectance that varies with the position of the element in respect to the monitoring point;

d. an interference filter that substantially transmits the test light and substantially reflects the reference light, the interference filter being applied to the element, generally coplanar with the reflective material; and e. light sensing means for producing a signal indicative of the intensity of the reference light reflected from the element and a signal indicative of the intensity of the test light reflected from the reflective material, a ratio of these signals being indicative of the position of the element in respect to the monitoring point.

15. The alignment insensitive optical position sensor of claim 14, further comprising first optical fiber means for transmitting the reference light and test light from the sources to the monitoring point.

16. The alignment insensitive optical position sensor of claim 15, further comprising second optical fiber means for transmitting the reference light and the test light reflected from the element to the light sensing means.

17. The alignment insensitive optical position sensor of claim 14, wherein the reflective material comprises dots of a metal film that have a variable density and/or a variable size as a function of their position on the element.

18. The alignment insensitive optical position sensor of claim 14, wherein the interference filter is applied to the element and the reflective material is applied over the interference filter.

19. The alignment insensitive optical position sensor of claim 14, wherein the reflective material is applied on the element and the interference material is applied as a multi-layer coating over the reflective material.

20. The alignment insensitive optical position sensor of claim 14, further comprising means for collimating the reference light and the test light from the sources along paths directed at the element.

21. The alignment insensitive optical position sensor of claim 14, further comprising means for focusing the reference light and the test light reflected from the element for transmittal to the light sensing means.

22. The alignment insensitive optical position sensor of claim 14, wherein the reflective material comprises a first track and a second track, and the reflectance of the reflective material in the two tracks varies inversely with position in respect to the monitoring point, the interference filter being applied to the element at both tracks, further comprising means for splitting the reference light into a first reference beam and a second reference beam, each reference beam being directed at a different one of the two tracks, and for splitting the test light into a first test beam and a second test beam, each test beam being directed at a different one of the two tracks.

23. The alignment insensitive optical position sensor of claim 22, wherein the light sensing means determine a ratio of the intensities of the first reference beam and the first test beam reflected from the element and a ratio of the intensities of the second reference beam and the second test beam reflected from the element, either ratio being indicative of the position of the element relative to the monitoring point, and determine a value proportional to a sum of these ratios.

24. The alignment insensitive optical position sensor of claim 23, wherein the light sensing means detect a fault in the optical position sensor if the value proportional to the sum of the ratios is not substantially constant.

* * * * *